US006443169B1

(12) United States Patent
Ferreira

(10) Patent No.: US 6,443,169 B1
(45) Date of Patent: Sep. 3, 2002

(54) PORTABLE APPARATUS FOR ROTATABLY MAINTAINING A PUMPING CONDUIT ON AN INCLINE

(76) Inventor: Fernando M Ferreira, 315 Woodhull Ave., Port Jefferson Station, NY (US) 11776

( * ) Notice: Subject to any disclaimer, the term of this patent is extended or adjusted under 35 U.S.C. 154(b) by 128 days.

(21) Appl. No.: 09/590,603

(22) Filed: Jun. 10, 2000

(51) Int. Cl.[7] .......................... B08B 3/00; F16M 11/24

(52) U.S. Cl. ............... 134/152; 134/167 C; 134/168 C; 134/169 C; 134/166 C; 248/188.2

(58) Field of Search ................................ 134/137, 140, 134/152, 166 C, 167 C, 166 R, 168 C, 169 C, 169 R; 182/155; 248/188.2

(56) References Cited

U.S. PATENT DOCUMENTS

| | | | | |
|---|---|---|---|---|
| 3,727,621 A | * | 4/1973 | Morton | 134/104.1 |
| 3,765,102 A | * | 10/1973 | Fischer | 34/136 |
| 3,835,587 A | * | 9/1974 | Hall, Jr. | 451/38 |
| 4,136,868 A | * | 1/1979 | Hogue | 482/145 |
| 4,509,544 A | * | 4/1985 | Mains, Jr. | 134/144 |
| 4,566,510 A | * | 1/1986 | Bartlett et al. | 108/102 |
| 4,723,377 A | * | 2/1988 | Watts | 134/152 |
| 4,804,064 A | * | 2/1989 | Coultrup et al. | 182/155 |
| 4,951,781 A | * | 8/1990 | Bliss | 108/115 |
| 5,135,580 A | * | 8/1992 | Cantrell et al. | 134/152 |
| 5,239,786 A | * | 8/1993 | Carpenter | 451/38 |

* cited by examiner

*Primary Examiner*—Alexander Markoff
*Assistant Examiner*—Joseph Perrin
(74) *Attorney, Agent, or Firm*—Michael I. Kroll

(57) ABSTRACT

The present invention 10 discloses a portable apparatus for rotatably maintaining a length of conduit 12 on an incline to allow an operator 16 to easily and thoroughly clean the conduit as he sprays a jet stream of liquid 24 into the conduit and rotates it manually to ensure the circumferential cleansing of the interior of the conduit. A pair of rows of rollers 14 are mounted on the top surface of the platform 36 surface upon which the conduit 12 revolves. The platform 36 is hingedly pivoted 42 at its midsection for folding. Multiple legs support the platform 36 on an incline, having a longer leg 26 having an A-frame shape and a shorter leg 58. Both legs 26, 58 are foldable and leg 26 is height adjustable. A rotatable pylon stop member 44 is positioned on the lower end of the platform 36 to retain conduit 12 on the platform 36. A slidable tray 46 is disposed on platform 36 for accepting longer conduits 12. A drive system 78 may also be provided to mechanically turn the rollers 14 and thereby the conduit 12. Furthermore, means for connecting 82 multiple platforms 36 together in order to form a longer platform for receiving longer conduit 12 may be provided.

11 Claims, 11 Drawing Sheets

PORTABLE APPARATUS FOR ROTATABLY MAINTAINING A PUMPING CONDUIT ON AN INCLINE

BACKGROUND OF THE INVENTION

1. Field of the Invention

The present invention relates generally to pipe-cleaning devices and, more specifically, to a portable apparatus for rotatably maintaining a length of conduit on an incline to facilitate the cleaning of fresh concrete and other material from therewithin by allowing an operator to use one hand to easily rotate the conduit resting on roller bearings secured to an inclined platform while the other hand remains free to simultaneously introduce a liquid jet spray therethrough thus utilizing the confluence to remove waste material adhering to the conduit and the effluence to flush the waste material out of the conduit. A rotatable pylon stop is located on the lower bearing side of the platform to prevent the conduit from sliding down the incline while providing minimal resistance to the conduit's rotatability.

2. Description of the Prior Art

There are numerous devices which provide for cleaning conduit. While these conduit-cleaning devices may be suitable for the purposes for which they where designed, they would not be as suitable for the purposes of the present invention as heretofore described. It is thus desirable to provide an inclined, conduit-cleaning platform with roller bearings to suspend the conduit in a freewheeling manner above a central portion of the platform. It is further desirable to provide an apparatus for cleaning conduit that is portable and could be folded into a compact unit for easy storage.

SUMMARY OF THE PRESENT INVENTION

The present invention discloses a portable apparatus for rotatably maintaining a length of conduit on an incline to allow an operator to easily and thoroughly clean the conduit as he sprays a jet stream of liquid into the conduit and rotates it manually to ensure the circumferential cleansing of the interior of the conduit. A pair of rows of rollers are mounted on the top surface of the platform surface upon which the conduit revolves. The platform is hingedly pivoted at its midsection for folding. Multiple legs support the platform on an incline, having a longer leg having an A-frame shape and a shorter leg. Both legs are foldable and the longer leg is height adjustable. A rotatable pylon stop member is positioned on the lower end of the platform to retain conduit on the platform. A slidable tray is disposed on the platform for accepting longer conduits. A drive system may also be provided to mechanically turn the rollers and thereby the conduit. Furthermore, means for connecting multiple platforms together in order to form a longer platform for receiving longer conduit may be provided.

A primary object of the present invention is to provide a portable apparatus for rotatably maintaining a length of conduit on an incline which will overcome the shortcomings of prior art devices.

Another object of the present invention is to provide a portable apparatus for rotatably maintaining a length of conduit on an incline that is easy and safe to use by providing a stable, inclined platform on which to rotate the conduit while spraying to insure that the conduit is at an appropriate incline to allow adequate effluent flow without the operator having to awkwardly lift and spin the conduit while trying to control the nozzle of the jet spray.

Another object of the present invention is to provide a portable apparatus for rotatably maintaining a length of conduit on an incline including a platform with two parallel rows of raised cylindrical freewheeling roller bearings running longitudinally that rotate perpendicular to the center of the platform and suspend the conduit above a central portion of the platform where it can be rotated clockwise or counterclockwise without rolling in one direction or the other.

A still further object of the present invention is to provide a portable apparatus for rotatably maintaining a length of conduit on an incline having a rotatable pylon stop comprising a post and cylindrical roller bearing extending perpendicularly from a lower central portion of the platform's topside thereby effectively preventing the conduit from sliding down and off the platform. The pylon is of a height that will only provide contact with the lower lip of the conduit and will therefore roll in the same direction to minimize rotational resistance from the weight of the conduit against the pylon.

A yet further object of the present invention is to provide a portable apparatus for rotatably maintaining a length of conduit on an incline having a platform comprising two sections that are connected by a hinge to permit the platform to fold in half for practical transport and storage.

Still another object of the present invention is to provide a portable apparatus for rotatably maintaining a length of conduit on an incline having a slidable tray on the superior end of the platform which would allow an operator the extend the platform to accommodate conduit members of varying lengths.

Another object of the present invention is to provide a portable apparatus for rotatably maintaining a length of conduit on an incline having two pivotally attached support stands that can swivel flush along the underside of the platform during storage.

Another object of the present invention is to provide a portable apparatus for rotatably maintaining a length of conduit on an incline having two pivotally attached support stands with telescoping legs to adjust the incline accordingly.

A yet further object of the present invention is to provide a portable apparatus for rotatably maintaining a length of conduit on an incline wherein the platform wheel bearings are affixed to the platform via a-frame axle supports that preserve bearing alignment.

Another object of the present invention is to provide a portable apparatus for rotatably maintaining a length of conduit on an incline having a motor with a drive mechanism to rotate the conduit rather than having the operator turn it manually.

Additional objects of the present invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

Figure 1:
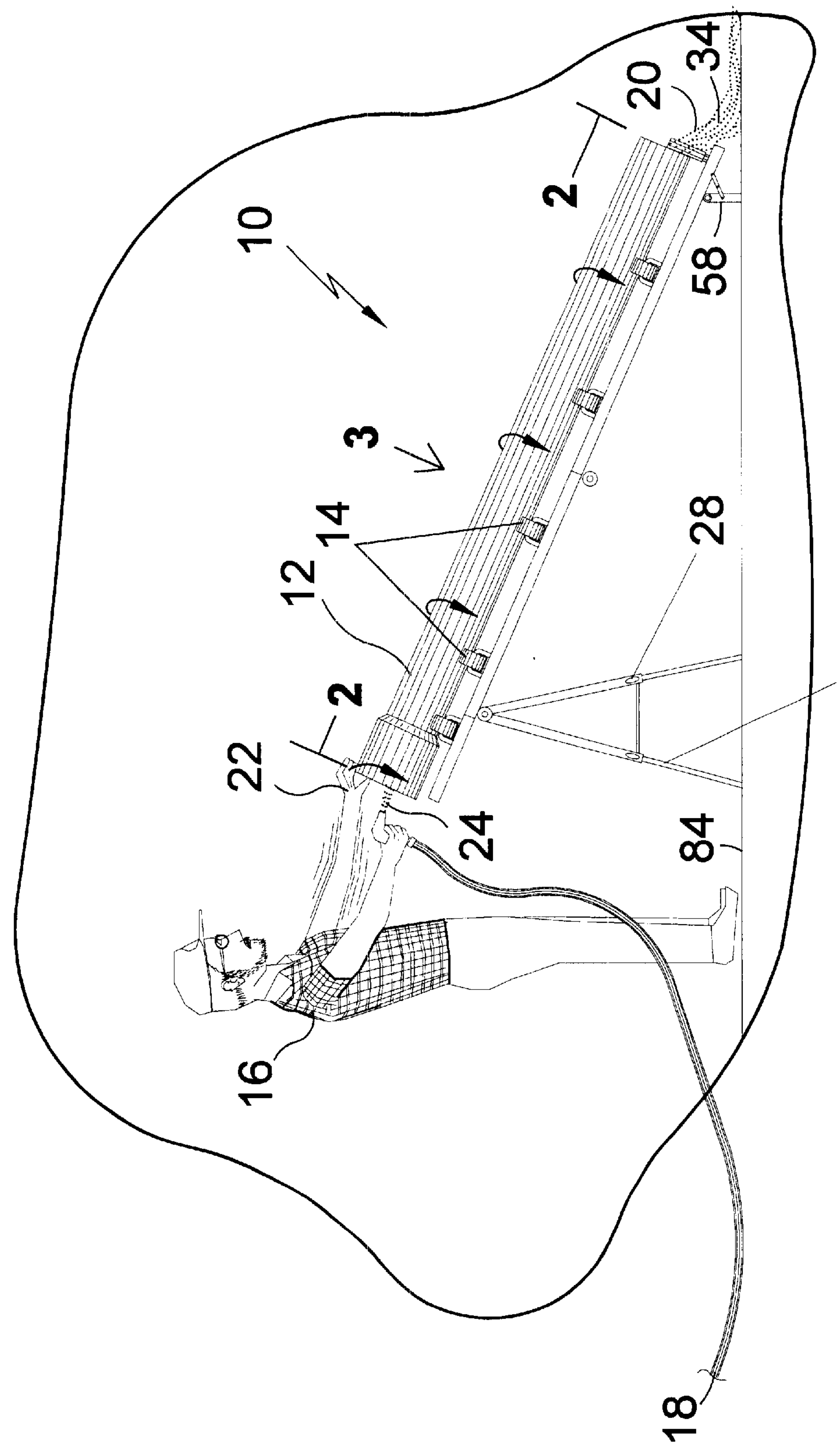
FIG. 1 is an illustrated side view of the present invention in use. A conduit is resting on the roller bearings and an operator is spinning it as he hoses down the interior wall to remove wet concrete that had been pumped through the conduit and is adhering to the conduit's interior circumference. The wheel bearings are freewheeling to permit the operator to rotate the conduit in either a clockwise or a counterclockwise direction as needed. A jet spray is introduced into the conduit to remove residual concrete that is flushed out with the effluvial flow which also helps clean the conduit.

With regard to reference numerals used, the following numbering is used throughout the drawings.

10 present invention
12 conduit
14 roller bearings
16 operator
18 water source
20 concrete
22 hand
24 water spray
26 A-frame platform support
28 locking or height adjustment mechanism
30 confluence
32 inside of conduit
34 effluent
36 platform
38 superior platform
40 inferior platform
42 platform hinge
44 pylon stop
46 slidable tray
48 support rod
50 direction arrow
52 roller axle
54 A-frame axle support
56 A-frame axle support legs
58 lower folding leg
60 support rods
62 support rod recess
64 seam
66 retaining brace
68 leg hinge
70 platform leg
72 bottom of platform
74 motor
76 battery
78 drive system
80 drive belt
82 fastening means
84 ground

DESCRIPTION OF THE PREFERRED EMBODIMENT(S)

In order that the invention may be more fully understood, it will now be described, by way of example, with reference to the accompanying drawings in which FIGS. 1 through 11 illustrate the present invention being a rotatable device for cleaning a conduit.

Turning to FIG. 1, shown therein is an illustrated side view of the present invention 10 in use upon the ground or other foundation 84. A conduit 12 is resting on multiple roller bearings 14 and an operator 16 is spinning it as he hoses down with a pressurized water source 18 the interior wall to remove wet concrete 20 that had been pumped through the conduit and is adhering to the conduit's interior surface or outer circumference. The wheel bearings 14 are freewheeling to permit the operator 16 to rotate by hand 22 the conduit 12 in either a clockwise or a counterclockwise direction as needed. A liquid jet spray 24 is introduced into the conduit 12 to remove residual concrete 20 that is flushed out with the effluvial flow 34 which also helps clean the conduit. The conduit 12 is supported by an A-frame stand support 26 having a locking height adjustment mechanism 28 thereon. Lower folding support leg 58 is also shown.

Figure 2:
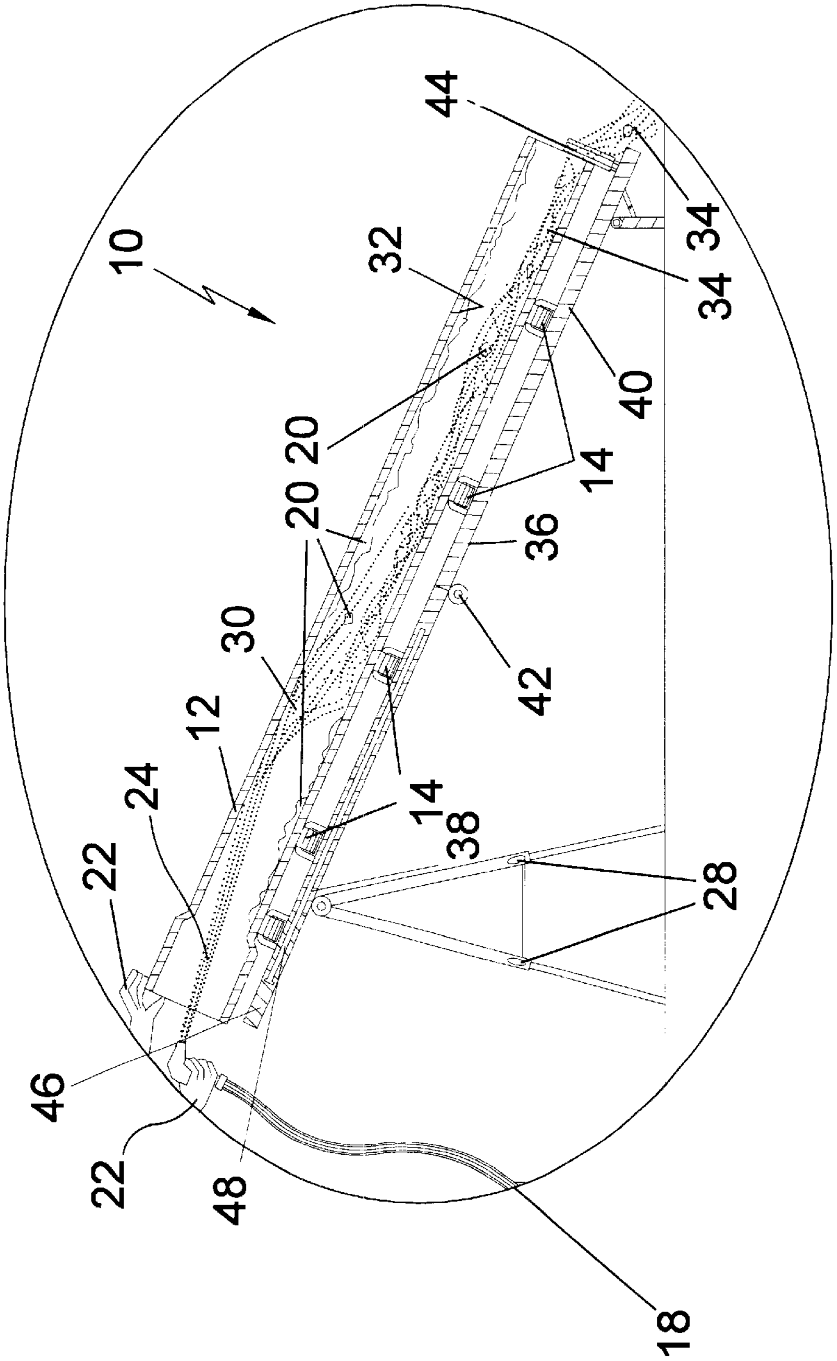
FIG. 2 is a cross-sectional side view of the present invention in use. Shown is an operator directing a liquid jet spray into a conduit wherein the confluence of the spray and wet concrete serve to remove the concrete from the inside of the conduit. The incline of the conduit provides for a rapid effluent flow which removes concrete from the lower conduit walls and from inside the conduit. Spinning the conduit during cleaning provides complete circumferential coverage both confluently and effluently.

Turning to FIG. 2, shown therein is a cross-sectional side view of the present invention 10 in use. Shown is an operator hand 22 directing a liquid jet spray into a conduit 12 wherein the confluence 30 of the spray 24 and wet concrete 20 serve to remove the concrete from the inside 32 of the conduit. The angular incline of the conduit 12 provides for a rapid effluent flow 34 which removes concrete 20 from the lower conduit walls and from inside the conduit. Spinning the conduit during cleaning provides complete circumferential coverage of the interior both confluently 30 and effluently 34. Also shown are rollers 14, water source 18, and height adjustment mechanism 28. A platform 36 is shown having a superior end 38 and an inferior end 40 joined intermediately by a pivotable platform hinge 42. Conduit 12 is prevented from sliding down platform 36 by pylon stop 44. Slidable tray 46 is shown for extending the platform 36 to receive conduit of varying length having support rods 48 therein.

Figure 3:
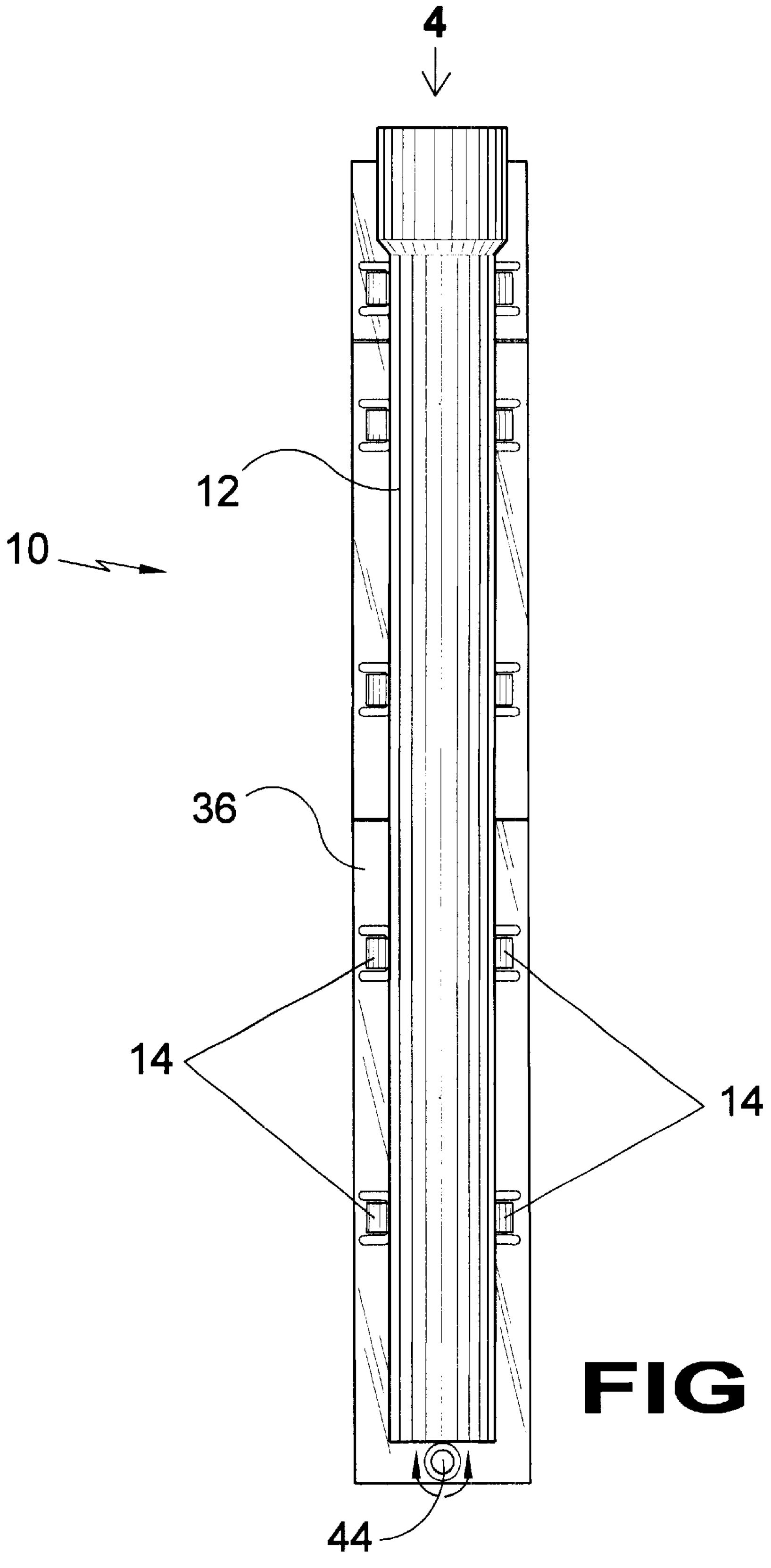
FIG. 3 is a top view of the present invention ready for use with a conduit in place. The conduit is resting on two parallel rows of cylindrical roller bearings which maintain the position of the conduit while allowing for free rotation of the conduit. A rotating pylon stop prevents the conduit from sliding down the incline and off the platform. The freewheeling capabilities of the pylon stop minimize the friction that would be created by the weight of a conduit resting against a stationary stop.

Turning to FIG. 3, shown therein is a top view of the present invention 10 ready for use with a conduit 12 in place. The conduit 12 is resting on two parallel rows of cylindrical roller bearings 14 which maintain the position of the conduit while allowing for free rotation of the conduit. A rotating pylon stop 44 prevents the conduit 12 from sliding down the incline and off the rectangular shaped platform 36. The freewheeling capabilities of the pylon stop 44 being rotatable about its centerline minimizes the friction that would be created by the weight of a conduit 12 resting against a stationary stop.

Figure 4:
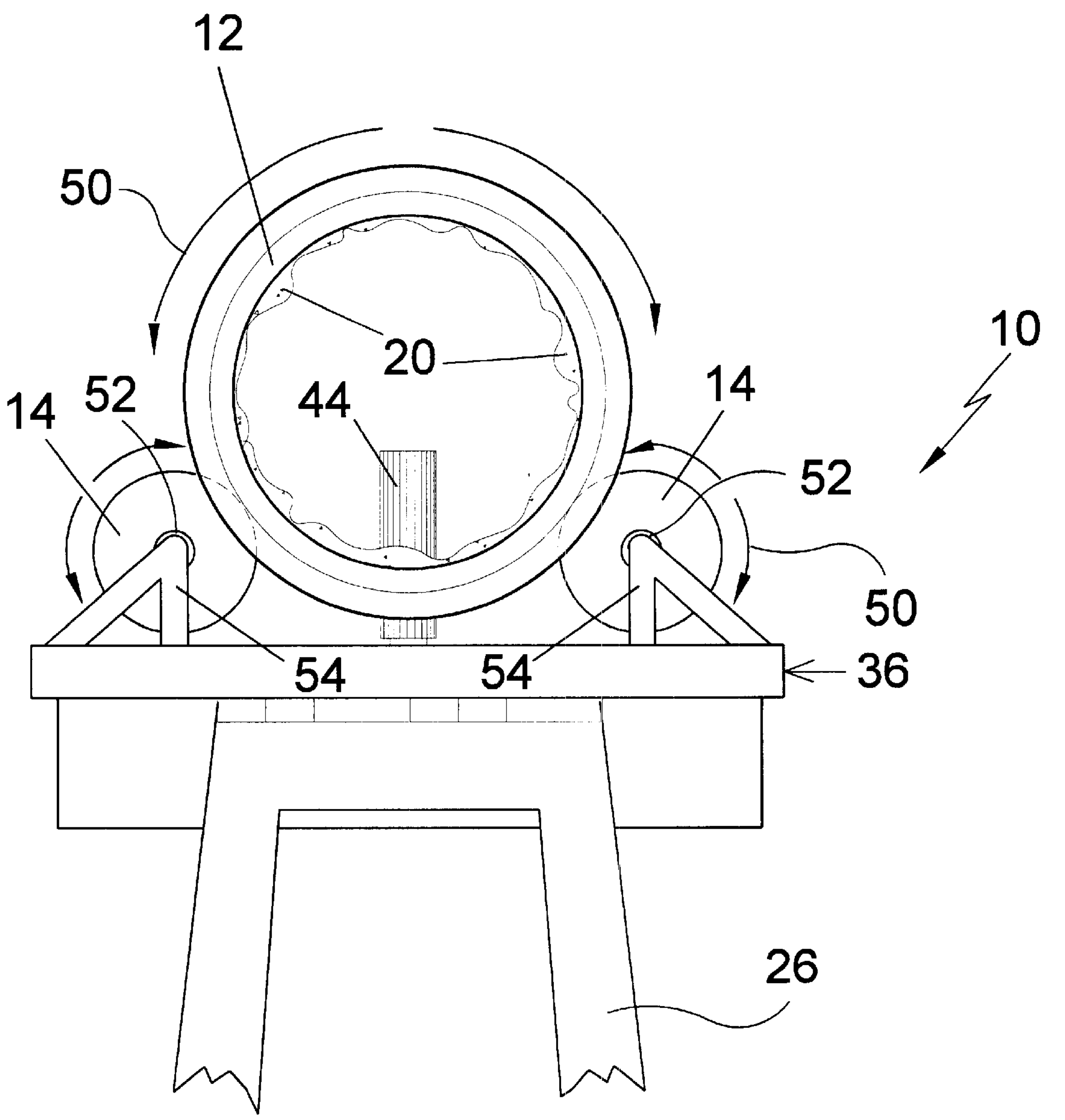
FIG. 4 is a top end view of the present invention and a conduit that needs cleaning taken from FIG. 3 as indicated. The conduit is resting on the rollers and arrows indicate the rotational capabilities of the conduit and rollers. The roller axle is supported by vertical and diagonal posts that form an a-frame axle support that serves to preserve alignment of wheel bearing rollers.

Turning to FIG. 4, shown therein is a top end view of the present invention 10 and a conduit 12 that needs cleaning taken from FIG. 3 as indicated. The conduit 12 is resting on the rollers 14 and direction arrows 50 indicate the rotational capabilities of the conduit and rollers. The roller axle 52 is attached and supported by vertical and diagonal posts that form an A-frame axle support 54 that serves to preserve alignment of wheel bearing rollers 14. The axle 52 centerline is disposed longitudinally on the platform 36 and stop member 44 is perpendicular thereto. Other elements previously disclosed are also shown.

Figure 5:
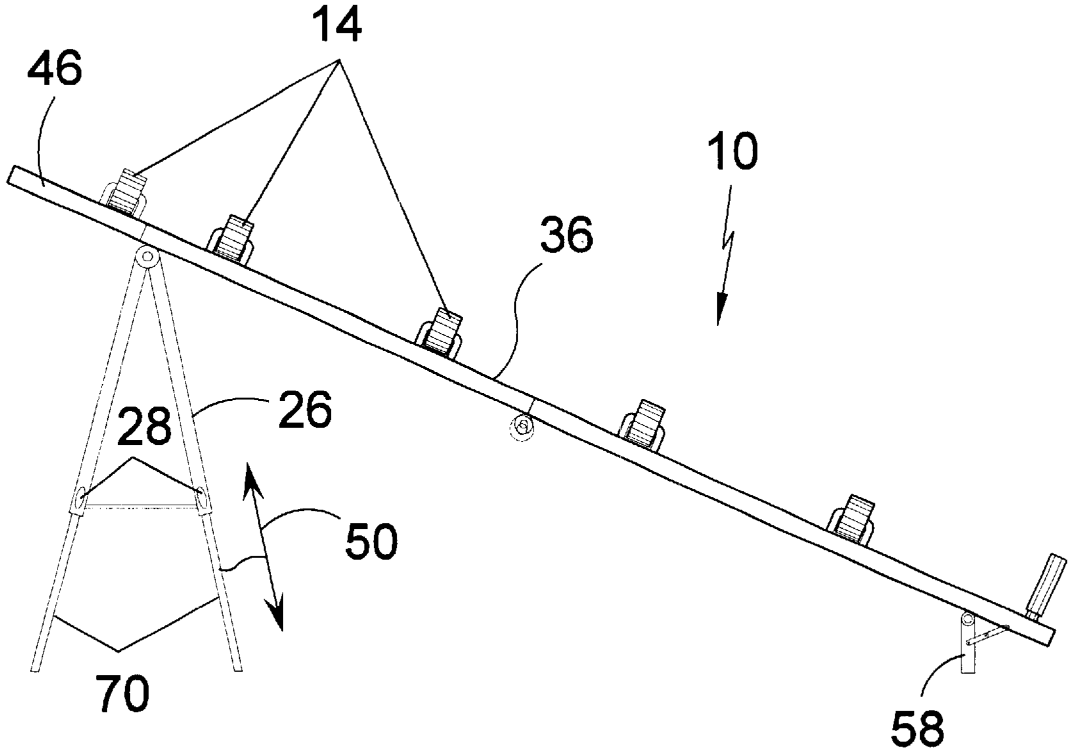
FIG. 5 is a side view of the present invention set up for operation and ready to receive a conduit on the wheel bearing rollers. The incline of the conduit has been adjusted accordingly by extending the telescoping legs of the A-frame stand and secured by the locking mechanisms

Turning to FIG. 5, shown therein is a side view of the present invention 10 set up for operation and ready to receive a conduit on the multiple wheel bearing rollers 14. The incline of the platform 36 has been adjusted accordingly (see direction arrow 50) by extending the telescoping legs 70 of the A-frame stand 26 and secured by the locking mechanisms 28. The slidable tray 46 and folding lower support leg 58 are also shown.

Figure 6:
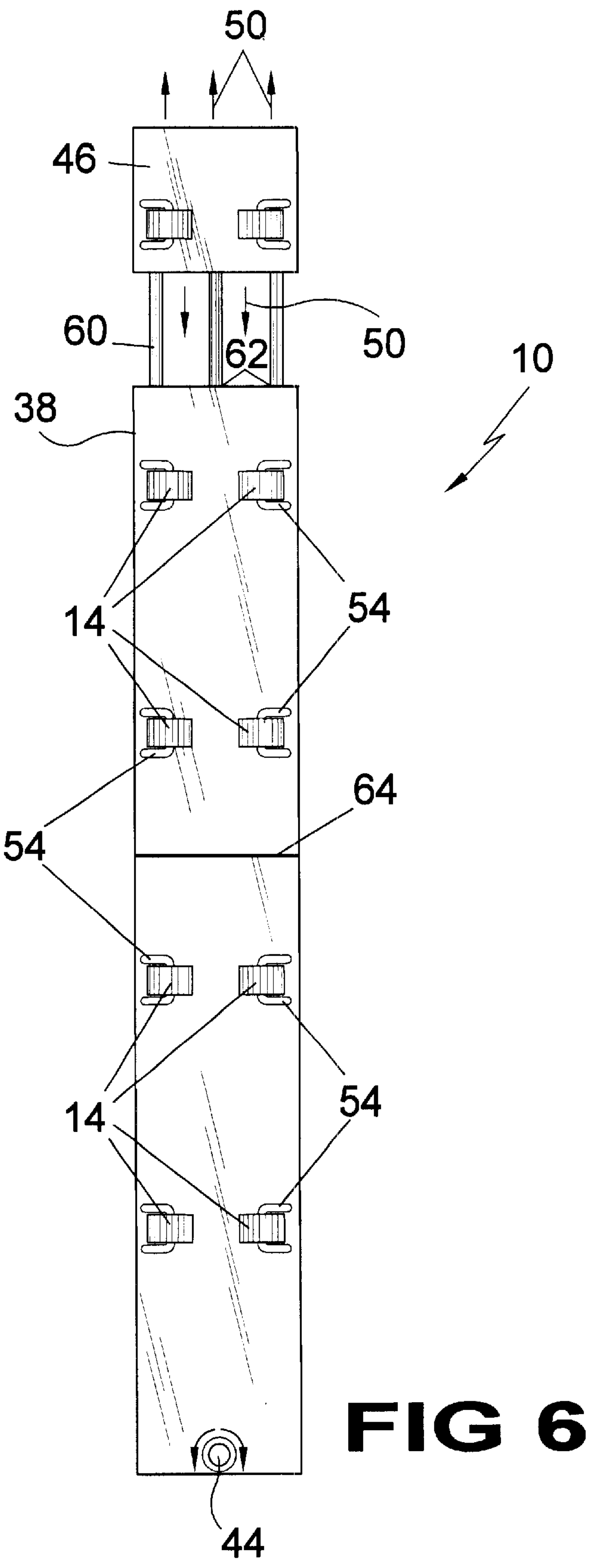
FIG. 6 is a top view of the present invention set up and ready for operation with the slidable tray partially extended. The slidable tray has support rods that extend outward and are inserted into corresponding recesses within the end superior platform.

Turning to FIG. 6, shown therein is a top view of the present invention 10 set up and ready for operation with the slidable tray 46 partially extended. The slidable tray 46 has multiple support rods 60 that extend outward (see direction arrows 50) and are inserted into corresponding recesses 62 within the end of the superior platform 38. A hinged seam 64 is also shown along with other elements previously disclosed.

Figure 7:
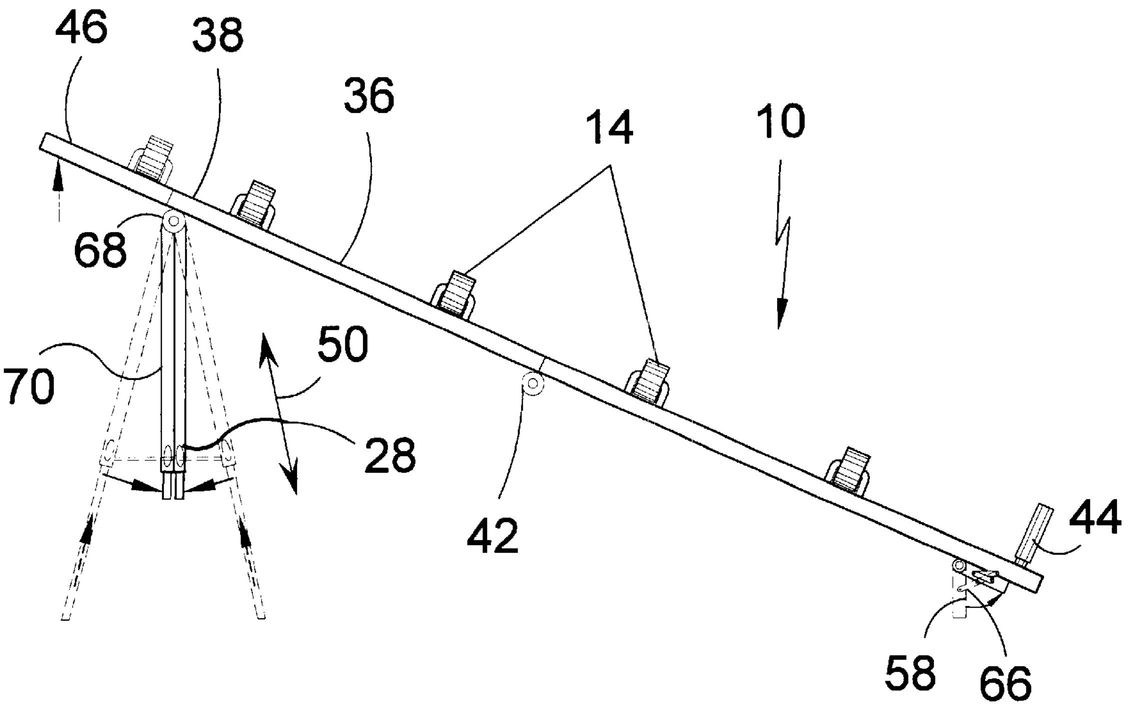
FIG. 7 is a side view of the present invention being prepared for storage. The telescoping legs have been collapsed and secured in the closed position by the locking mechanisms. The retaining brace of the lower support leg has been released and the support leg has swung flush against the platform. The superior end of the platform is lifted and the two hinged support legs swing against one another and hang perpendicular to the ground.

Turning to FIG. 7, shown therein is a side view of the present invention 10 being prepared for storage. The telescoping legs 70 have been collapsed and secured in the closed position by the locking mechanisms 28. The retaining brace of the lower support leg 58 have been released and the support leg 58 can be swung flush against the platform 36. The superior end of the platform 38 is lifted and the two hinged 68 support legs 70 swing against one another and hang perpendicular to the ground. Other elements previously disclosed are also shown.

Figure 8:
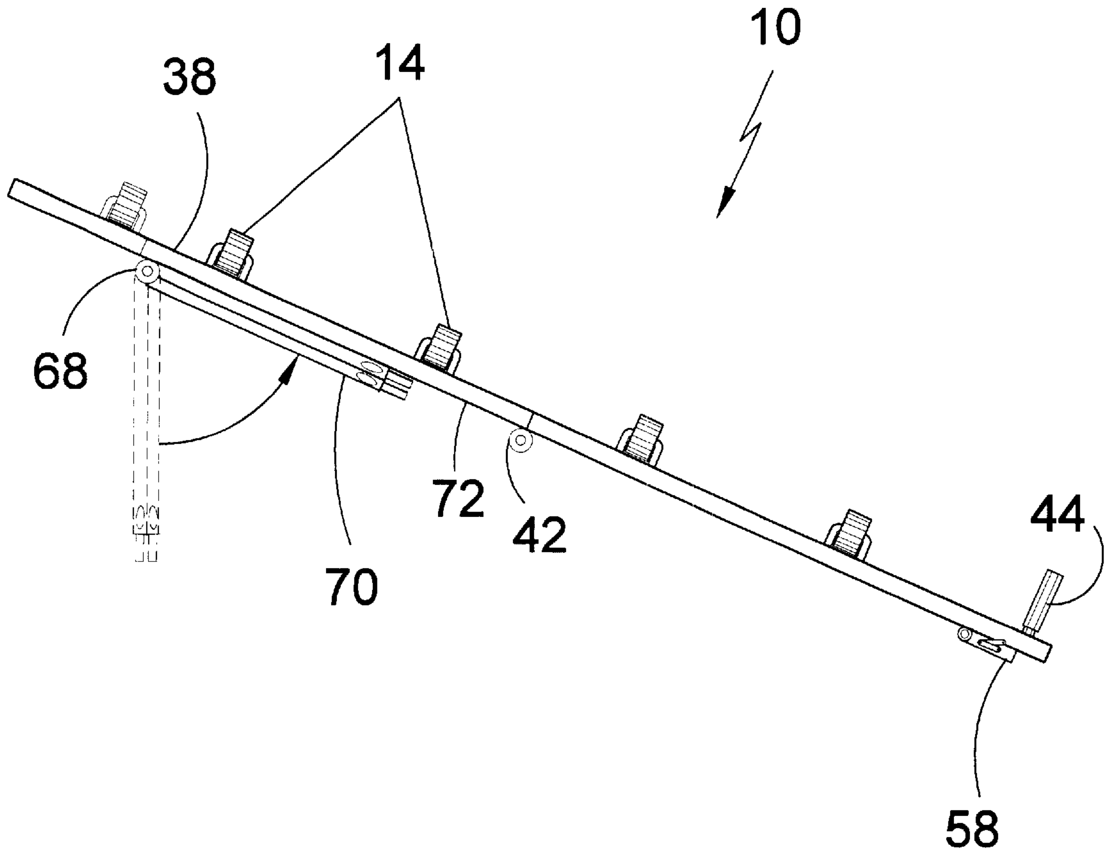
FIG. 8 is a side view of the present invention being prepared for storage. The superior end of the platform is lifted and the two hinged support legs have swung against one another and are folded flush against the bottom of the platform.

Turning to FIG. 8, shown therein is a side view of the present invention 10 being prepared for storage. The superior end of the platform 38 is lifted and the two hinged 68 support legs 70 have swung against one another and are folded flush against the bottom 72 of the platform. Other elements previously disclosed are also shown.

Figure 9:
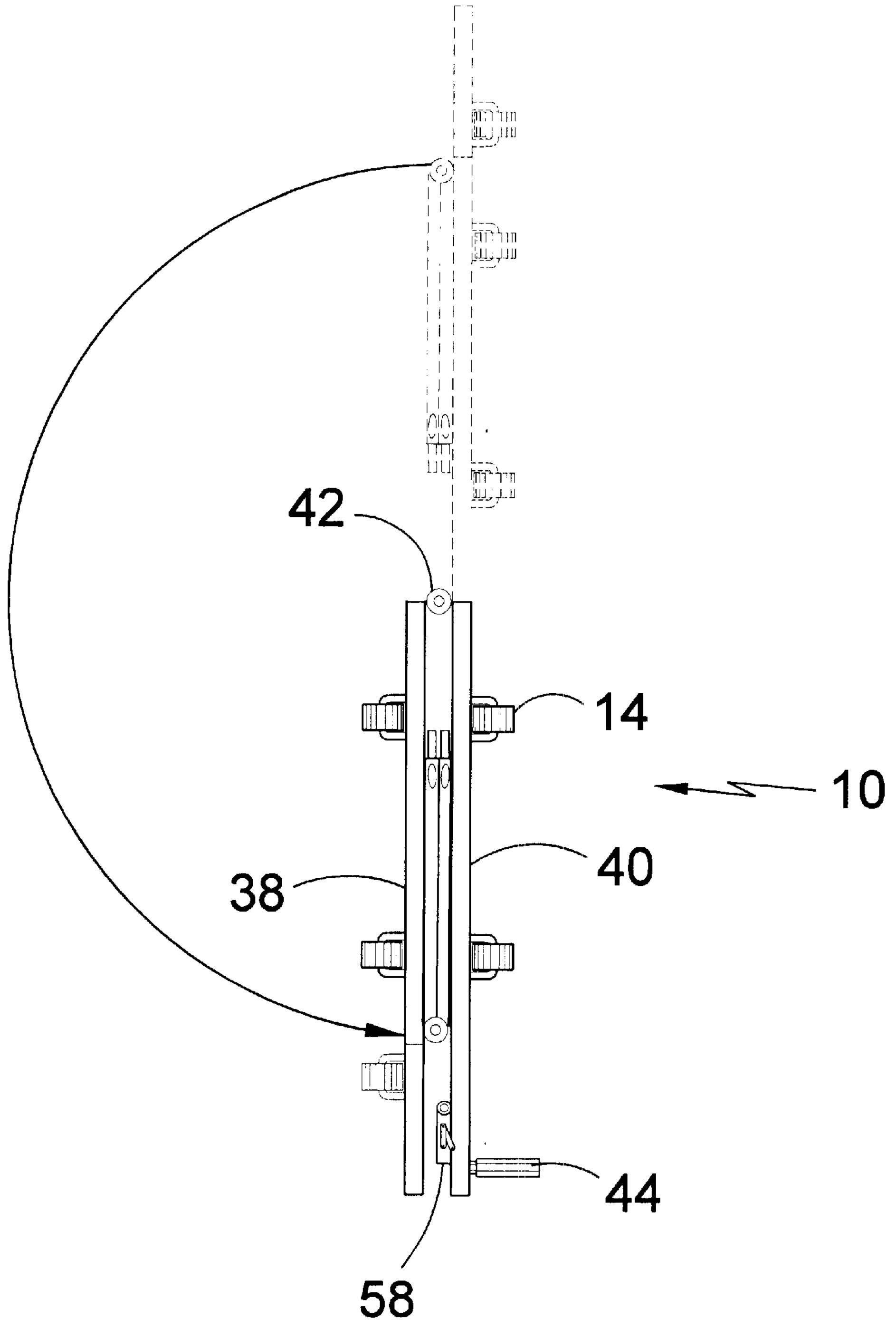
FIG. 9 is a side view of the present invention being prepared for storage. The two platforms pivot by the hinged midsection until they are parallel. The pylon stop can be used as a handle to aid in transporting the present invention.

Turning to FIG. 9, shown therein is a side view of the present invention 10 being prepared for storage. The two platforms 38, 40 pivot by the hinged midsection 42 until they are parallel. The pylon stop 44 can be used as a handle to aid in transporting the present invention. Other elements previously disclosed are also shown.

Figure 10:
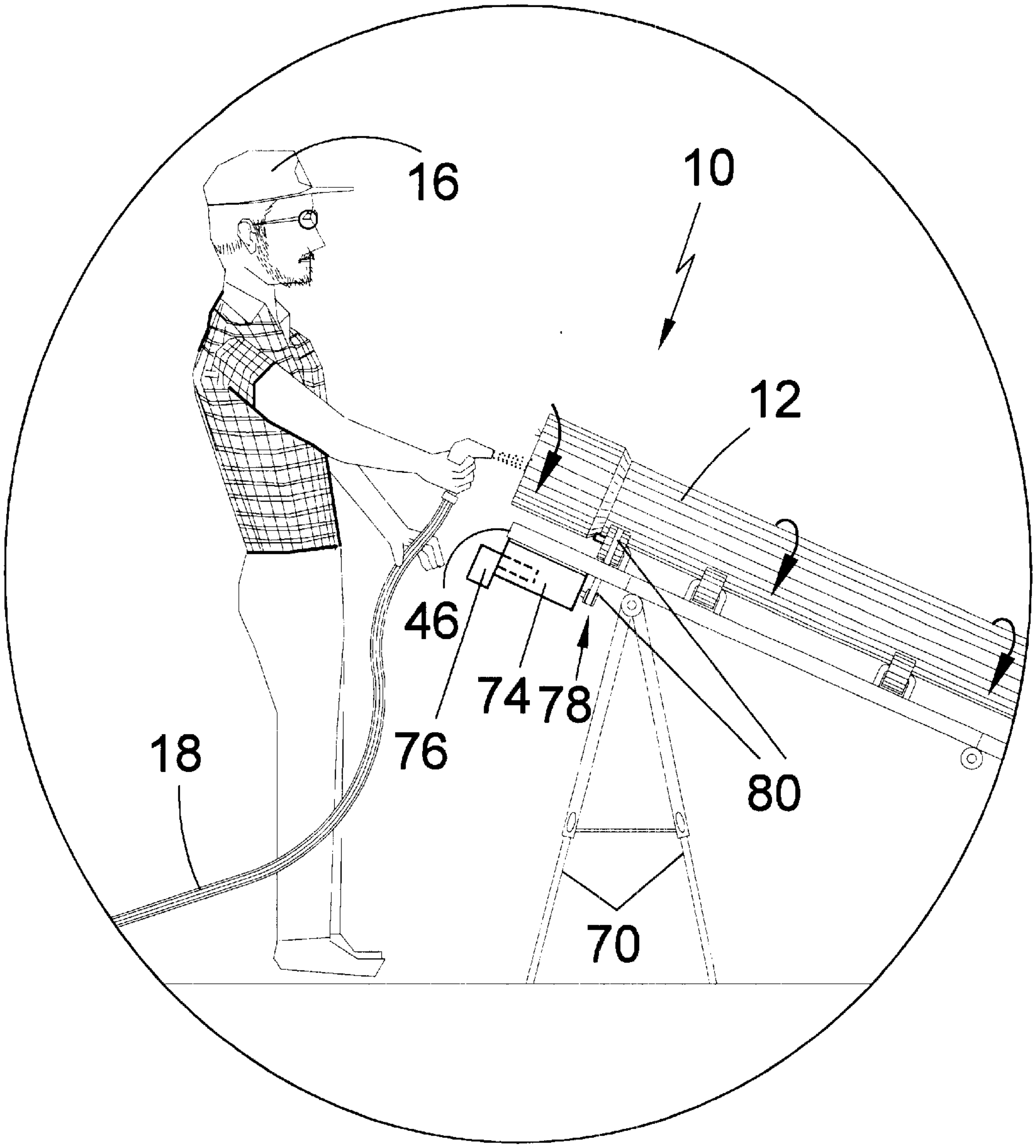
FIG. 10 is a side view of the present invention in use with a motorized rotation mechanism to turn the conduit. The motor is powered by a rechargeable battery but can also be adapted for 110 VAC. The motor and drive system are located on the slidable tray which can be easily removed for storage, security, etc.

Turning to FIG. 10, shown therein is a side view of the present invention 10 in use with a motorized 74 rotation mechanism to turn the conduit. The motor 74 is powered by a rechargeable battery 76 but can also be adapted for 110 VAC. The motor 74 and drive system 78 using drive belts 80 are located on the slidable tray 46 which can be easily removed for storage, security, etc. Other elements previously disclosed are also shown.

Figure 11:
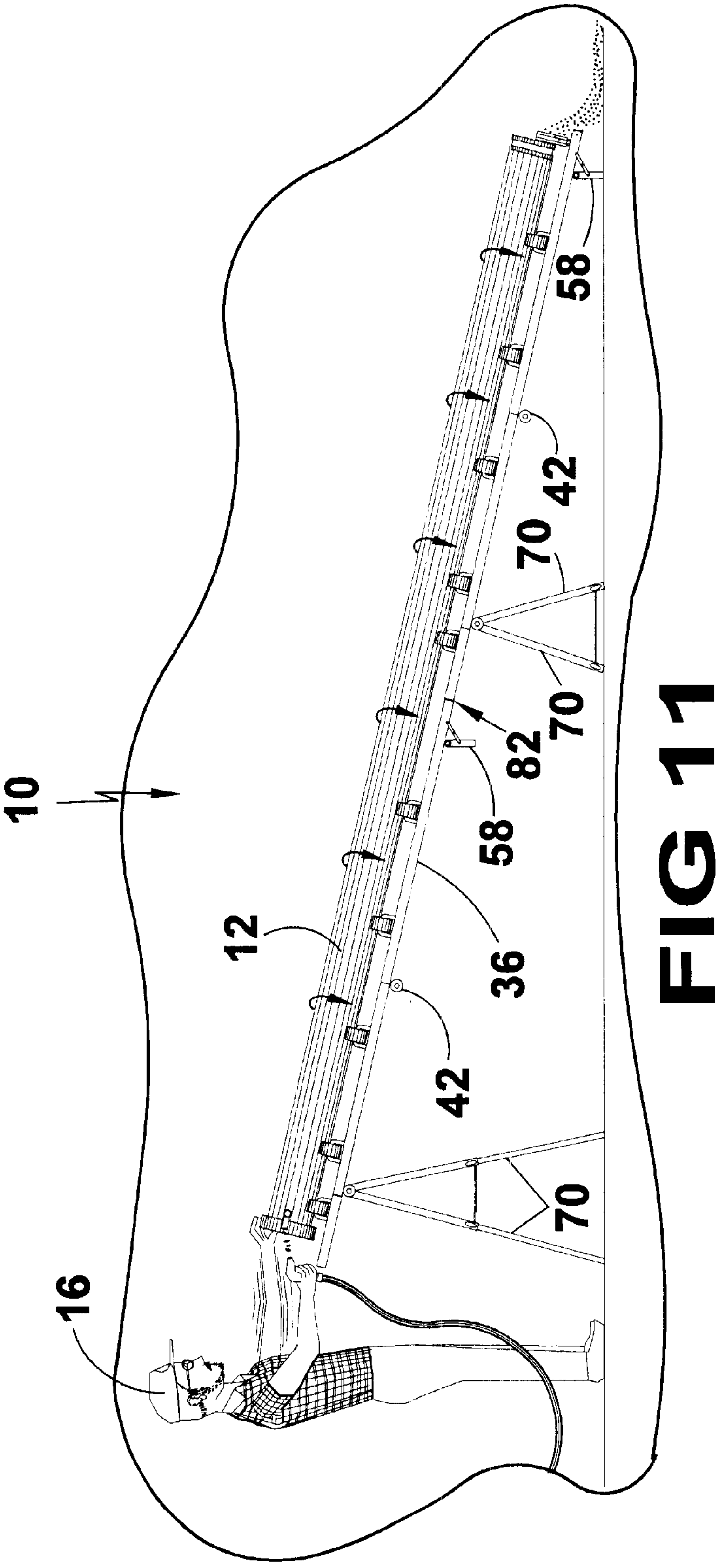
FIG. 11 is a side view of the present invention in use wherein two separate apparatuses are joined together to accommodate conduit of a length too great for a single apparatus. The rotating pylon stop of superior apparatus has been removed to allow continuity of the platform surface. The telescoping legs permit the operator to adjust the incline accordingly. The fastening means could include bolts, clamps, an interlocking system or any other means that is secure and simple to use.

Turning to FIG. 11, shown therein is a side view of the present invention 10 in use wherein two separate apparatuses are joined together to accommodate conduit of a length too great for a single apparatus. The rotating pylon stop (not shown) of the superior apparatus has been removed to allow continuity of the platform 36 surface. The telescoping legs 70 permit the operator 16 to adjust the incline accordingly. The fastening means 82 could include bolts, clamps, an interlocking system or any other means that is secure and simple to use. Other features of this embodiment are as previously disclosed.

What is claimed to be new and desired to be protected by letters patent is set forth in the appended claims.

I claim:

1. Portable apparatus foldable for easy storage for removing fresh concrete from a conduit interior for operation by a human, comprising:

a) a planar surface being generally rectangular shaped defined by a topside and an underside, said surface disposed on an incline;

b) a plurality of rollers mounted on said topside of said planar surface;

c) said plurality of rollers being formed into two parallel rows for rotatably receiving the conduit thereon;

d) a shorter lower support leg disposed on said underside of said surface for supporting said surface directly on a ground;

e) a longer upper support leg disposed on said underside of said surface for supporting said surface directly on a ground whereby said surface is disposed on an incline;

f) a stop member disposed on said topside of said planar surface, said stop member forming a stop for the conduit, said stop member being freewheeling, and said stop member being disposed perpendicular to said topside of said surface; and, g) a source of pressurized liquid for use by the human for cleaning the interior of the conduit disposed on said rollers.

2. The apparatus of claim 1, said surface having a first superior portion and a second inferior portion, and a first hinged means for connecting said first superior portion to said second inferior portion, whereby said first superior portion can be folded against said second inferior portion for convenient storage.

3. The apparatus of claim 2, said shorter support leg further comprising hinged connection means to said underside of said surface for folding against said platform, said longer support leg further comprising hinged connection means to said underside of said surface for folding against said-platform, and said longer support leg further comprising an A-frame support leg having means for height adjustment whereby the height of said surface can be varied.

4. The apparatus of claim 1, said plurality of rollers each having an axle, said axle centerline disposed longitudinally on said surface for receiving the conduit, each of said rollers being independently mounted on said planar surface.

5. The apparatus of claim 4, said axles further comprising an independent A-frame axle support whereby said roller is connected to said surface.

6. The apparatus of claim 2, further comprising a slidable tray disposed on said first superior portion of said surface, said tray complementarily shaped as said surface.

7. The apparatus of claim 6, further comprising a plurality of rods whereby said tray is slidable.

8. The apparatus of claim 7, said end of said first superior portion having a plurality of recesses therein for receiving said rods internal said first superior portion.

9. The apparatus of claim 1, further comprising means for connecting a plurality of surfaces whereby a series of apparatuses can be joined together for cleaning a long length of conduit.

10. The apparatus of claim 1, further comprising means for rotating said rollers whereby said rollers and said conduits are mechanically turned.

11. The apparatus of claim 10, said means for rotating said rollers further comprising a motor means, said motor means having means for a drive system for said rollers, said means for a drive system further comprising a drive belt for rotating the conduit.

* * * * *